No. 609,040. Patented Aug. 16, 1898.
E. E. MURPHY.
CARBONATING APPARATUS.
(Application filed Aug. 19, 1896. Renewed Nov. 26, 1897.)
(No Model.)
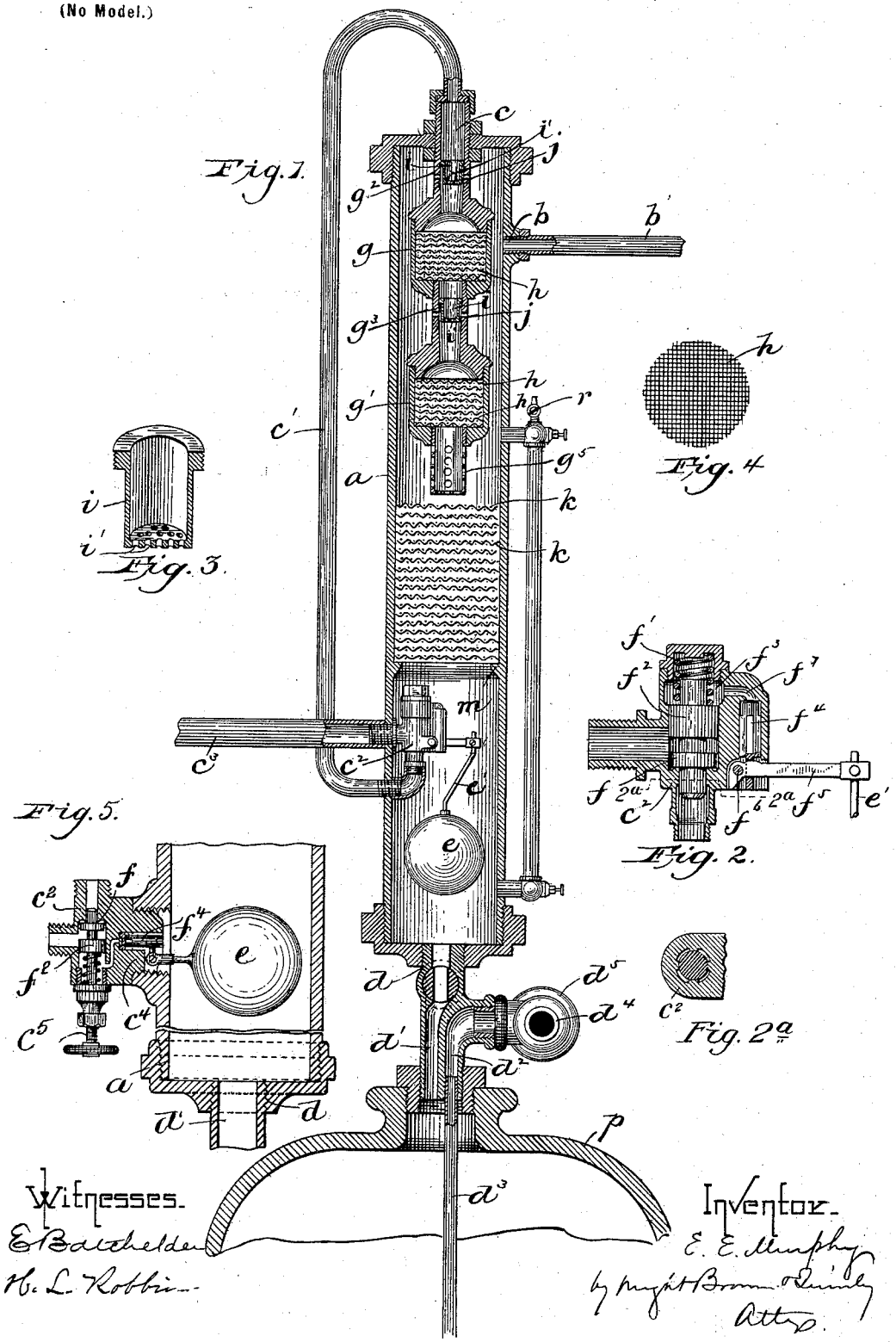
Witnesses.
Inventor.

UNITED STATES PATENT OFFICE.

EDWARD E. MURPHY, OF BOSTON, MASSACHUSETTS, ASSIGNOR TO THE NEW ERA PROCESS COMPANY, OF WEST VIRGINIA.

CARBONATING APPARATUS.

SPECIFICATION forming part of Letters Patent No. 609,040, dated August 16, 1898.

Application filed August 19, 1896. Renewed November 26, 1897. Serial No. 659,851. (No model.)

*To all whom it may concern:*

Be it known that I, EDWARD E. MURPHY, of Boston, in the county of Suffolk and State of Massachusetts, have invented certain new and useful Improvements in Carbonating Apparatus, of which the following is a specification.

This invention relates to apparatus for carbonating water and other liquids; and it has for its object to provide a simple and efficient apparatus which shall insure a thorough mechanical combination between the liquid and the carbonic-acid or other gas and shall be automatic in its action, the carbonating operation being controlled by the accumulation of carbonated liquid, ceasing when a predetermined quantity is accumulated and going on when the accumulation is reduced.

The invention consists in the improvements which I will now proceed to describe and claim.

Of the accompanying drawings, Figure 1 represents a vertical sectional view of an apparatus embodying my invention. Figs. 2 and 2ᵃ represent sectional views of one form of liquid-controlled valve. Fig. 3 represents a perspective sectional view of one of the liquid-supply nozzles. Fig. 4 represents a side view of one of the disks of wire-netting. Fig. 5 represents a sectional view showing another form of valve.

The same letters of reference indicate the same parts in all the figures.

In the drawings, $a$ represents the main body or casing of the apparatus, which is preferably of cylindrical form, and has a gas-inlet $b$ and a water-inlet $c$ in its upper portion and an outlet $d$ in its lower portion for the carbonated liquid. The gas-inlet is connected by a pipe $b'$ with a suitable source of supply of carbonic-acid or other gas adapted to maintain a continuous pressure of gas within the casing. The water-inlet is connected by a pipe $c'$ with a valve-casing $c^2$, which receives water through a pipe $c^3$ from a suitable source of supply of water under pressure. The valve-casing $c^2$ has a valve which is controlled by an accumulation of liquid in the lower portion of the casing, said portion containing a float $e$, which is raised by the liquid and causes the valve to close the pipe $c'$ when a predetermined quantity of liquid has been accumulated, the descent of the float caused by the drawing off of the liquid causing the valve to open. Any suitable valve may be employed, a suitable construction being shown in Fig. 2, in which $f$ is the main valve, formed to close a seat through which water passes to the pipe $c'$ and normally held against said seat by a spring $f'$, aided by water-pressure on the upper side of a piston $f^2$ on the stem of the valve $f$, said piston fitting the casing somewhat loosely, so that water from the pipe $c^3$ can pass around it into a chamber $f^3$ in the upper portion of the casing.

$f^4$ is an auxiliary valve supported by a lever $f^5$, which is pivoted at $f^6$ to the valve-casing and is connected at its other end with the float rod or stem $e'$. When the float is raised, the auxiliary valve closes an outlet $f^7$ from the chamber $f^3$, causing an accumulation of water-pressure in said chamber, which, in connection with the spring $f'$, closes the valve $f$. When the float descends, the auxiliary valve opens the outlet $f^7$, whereupon the water that flows around the piston $f^2$ escapes into the casing $a$, relieving the pressure above the piston $f^2$, so that the pressure below said piston raises it and opens the valve.

$g\ g'$ represent chambers located in the upper portion of the casing. The chamber $g$ is connected directly with the water-inlet by a tubular neck $g^2$, while the chamber $g'$ is connected with the chamber $g$ by a tubular neck $g^3$. Each chamber contains a series of layers $h$ of wire-cloth of fine mesh for the purpose of breaking up the water and exposing it to contact with the gas in such manner as to cause a thorough mixture of the gas and water. Each neck $g^2\ g^3$ contains a nozzle $i$, which is open at one end and provided with a screw-threaded flange for attachment to the neck and has a head at its other end provided with numerous perforations $i'$. Each nozzle is separated from the inner wall of the neck in which it is contained by an annular space which receives gas from the casing through orifices $j$, formed in said necks, said orifices being preferably above the perforated heads of the nozzles $i$. The chamber $g'$ has a perforated nozzle $g^5$ at its lower end which distributes the liquid and gas passing throuhg said chamber. Below the chamber $g'$ is an accumulation of wire-cloth layers $k$, which are supported by a shoulder $m$ on the inner surface of the casing and extend entirely across the casing, so that all the gas and liquid pass through said layers.

Operation: The casing $a$ is first charged with gas and then water is admitted through the inlet $c$. The water in passing through the first nozzle $i$ comes in contact with the gas that already fills the chamber $g$ and draws more gas through the orifice $j$, the nozzle operating on the injector principle. The liquid and gas pass through the wire-cloth layers $h$ in the first chamber, partially combining mechanically therein, and then pass through the second nozzle $i$, where more gas is drawn in through the orifices in the neck $g^3$, the water and gas passing through the wire-cloth layers in the chamber $g'$, where the mechanical combination becomes more perfect. The now partially-carbonated liquid then passes in small streams through the nozzle $g^5$, by which it is distributed through the gas surrounding said nozzle and discharged upon the layers $k$ $k$. In the passage of the gas and liquid through the last-mentioned layers the mechanical combination becomes still more perfect, the carbonated liquid accumulating in the lower portion of the casing, from which it may pass to a reservoir $p$ to be bottled, or it may pass to a pipe or system of pipes having delivery-faucets. When a reservoir $p$ is used, the outlet $d$ is preferably provided with two passages $d'$ $d^2$, one delivering the carbonated liquid to the reservoir, while the other is connected with a tube $d^3$, extending nearly to the bottom of the reservoir, and with a delivering-tube $d^4$, extending to a bottling-table or to a fountain and provided with a suitable valve or cock $d^5$, the said outlet $d$ being adapted for detachable connection with the reservoir in any suitable way.

It will be seen that I have provided for a thorough mechanical combination of the gas and water, the gas-inducing nozzles $i$ performing an important part of the operation by causing a greater volume of gas to come in contact with the liquid than would be caused by the gas-pressure alone, the water-pressure being greater than the gas-pressure and therefore inducing a flow of gas into the chambers $g$ $g'$ and forcing a combination of the gas and liquid.

I do not limit myself to the wire-cloth layers as the means for subdividing the gas and water, as any other suitable means—such as a body composed of small pieces or fragments of porcelain, glass, or other suitable material—may be used for the same purpose.

In Fig. 5 I show the casing $c^2$ of the automatic valve located outside the reservoir $a$, said casing having a screw-threaded end portion $c^4$, which is engaged with a threaded orifice in the wall of the reservoir, the auxiliary valve being located in said portion and acted on by the float-lever, which in this case is pivoted to the valve-casing. A screw-threaded stem $c^5$ is provided whereby the main valve may be held closed when it is desired to disconnect the valve-casing from the reservoir $a$. This construction permits the ready disconnection of the valve-casing from the reservoir, as will be readily seen.

$r$, Fig. 1, represents an air-valve which is to be opened to permit the escape of air when the reservoir $a$ is being charged with gas.

I claim—

1. An apparatus of the character specified, comprising a reservoir or casing having a gas-inlet and a liquid-inlet, a chamber arranged in said casing and connected with the liquid-inlet by a perforated nozzle whereby gas is drawn into said chamber by the liquid, and means in said chamber between the outlet therefrom and the nozzle for subdividing and mechanically combining the gas and liquid.

2. An apparatus of the character specified, comprising a reservoir or casing having a gas-inlet, a liquid-inlet, a gas and liquid receiving chamber within the casing communicating with the liquid-inlet and provided at its upper portion with a gas-inducing liquid-supply nozzle, and below said nozzle with means for subdividing the gas and liquid, and additional subdividing means extending across the casing below the outlet of said chamber.

3. An apparatus of the character specified, comprising a reservoir or casing having a gas-inlet, a liquid-inlet, a chamber in said casing having a tubular neck connected with the liquid-inlet, said neck having gas-supply openings, a gas-inducing liquid-supply nozzle in said neck, and means within the chamber for mechanically combining the gas and liquid.

4. An apparatus of the character specified, comprising a reservoir or casing, a gas-inlet, a liquid-inlet, a series of communicating chambers in said casing, each having a receiving-neck at its upper end, the lower chamber having also a perforated distributing-nozzle, gas-inducing liquid-supply nozzles in said necks, gas and liquid subdividing fillings in the chambers, and a similar filling in the casing below said chambers.

5. An apparatus of the character specified, comprising a reservoir or casing having a gas-inlet and a liquid-inlet in its upper portion and a space for the accumulation of carbonated liquid in its lower portion, means for mechanically combining gas and liquid above said space, and an outlet for the carbonated liquid having two passages $d'$ $d^2$, the latter having a downwardly-extending tube $d^3$ and a valved delivery-tube $d^4$.

6. An apparatus of the character specified, comprising a reservoir or casing having a gas-inlet and a liquid-inlet in its upper portion and a space for the accumulation of carbonated liquid in its lower portion, means for mechanically combining gas and liquid above said space, a valve-casing detachably connected with the reservoir and having a threaded portion projecting into the reservoir, a main valve and an auxiliary valve in said casing, and a float within the reservoir arranged to act on the auxiliary valve.

7. An apparatus of the character specified, comprising a carbonating-chamber, a casing in the upper portion of the chamber having provisions for mechanically mixing gas and liquid and for discharging the mixture, and a wire sponge in the lower portion of the carbonating-chamber, which receives the said mixture, the chamber having an outlet below said wire sponge, through which the carbonated liquid passes.

8. In an apparatus of the character specified, comprising a reservoir or casing, a chamber arranged in said casing and communicating therewith, independent inlets for the liquid and gas, means for bringing the liquid and gas into the presence of each other in said chamber, and a wire sponge through which the liquid and gas subsequently pass located within said chamber for subdividing and mechanically combining the gas and liquid.

9. An apparatus of the character specified, comprising a reservoir or casing for holding the carbonated liquid and having a gas-supply inlet, a chamber communicating with said reservoir or casing and arranged therein, gas-supply openings in said chamber, a liquid-supply inlet independent of said gas-supply inlet and communicating with said chamber by a perforated nozzle whereby gas is drawn directly from said reservoir through said openings into said chamber by the liquid from said nozzle, and means located adjacent to said nozzle for retarding the flow of the liquid and gas and through which the liquid and gas are forced under pressure for subdividing and mechanically combining the same.

10. An apparatus of the character specified, comprising a reservoir or casing for holding the carbonated liquid and having a gas-supply inlet, a chamber communicating with said reservoir or casing and arranged therein, gas-supply openings in said chamber, a liquid-supply inlet independent of said gas-supply inlet and communicating with said chamber by a perforated nozzle whereby gas is drawn directly from said reservoir through said openings into said chamber by the liquid from said nozzle, and a wire sponge located adjacent to said nozzle for retarding the flow of the liquid and gas and through which the liquid and gas are forced under pressure for subdividing and mechanically combining the same.

11. In an apparatus of the character specified, a reservoir or casing having a gas-inlet supply, a chamber communicating with said reservoir or casing and arranged therein and having a tubular neck provided with gas-supply openings and connected with a liquid-supply inlet independent of said gas-supply inlet, a gas-inducing liquid-supply nozzle connected to said liquid-inlet and located in said neck to draw gas directly from said reservoir through said openings, and means for retarding the flow of the liquid and gas and through which said liquid and gas are forced under pressure for subdividing and mechanically combining the same.

12. In an apparatus of the character specified, a reservoir or casing having a gas-inlet supply, a chamber communicating with said reservoir or casing and arranged therein and having a tubular neck provided with gas-supply openings and connected with a liquid-supply inlet independent of said gas-supply inlet, a gas-inducing supply-nozzle connected to said liquid-inlet and located in said neck to draw gas directly from said reservoir through said openings, and foraminous means for retarding the flow of the liquid and gas and through which said liquid and gas are forced under pressure for subdividing and mechanically combining the same.

In testimony whereof I have signed my name to this specification, in the presence of two subscribing witnesses, this 3d day of July, A. D. 1896.

EDWARD E. MURPHY.

Witnesses:
E. BATCHELDER,
H. L. ROBBINS.